UNITED STATES PATENT OFFICE.

JOHN RILEY AND CHARLES W. BISSELL, OF TROY, NEW YORK, ASSIGNORS, THROUGH MESNE ASSIGNMENTS, TO THE UNITED STATES AND FOREIGN SALAMANDER FELTING COMPANY, OF SAME PLACE.

IMPROVEMENT IN COMPOSITIONS FOR COVERING STEAM-BOILERS, STEAM-PIPES, &c.

Specification forming part of Letters Patent No. 95,517 dated October 5, 1869; reissue No. 4,134, dated September 27, 1870.

*To all whom it may concern:*

Be it known that we, JOHN RILEY and CHARLES W. BISSELL, of the city of Troy, in the county of Rensselaer and State of New York, have invented a new and Improved Composition or Cement for the Covering or Coating of Steam Boilers and Pipes, or other similar devices, to prevent the radiation of heat and condensation of steam, and thereby economizing the use of fuel, of which the following is a specification:

The nature of our invention consists in combining the several ingredients hereinafter named in such a manner as to produce an adhesive paste or cement that will adhere firmly to the surface of the boiler or pipe which it surrounds, and will expand and contract according to the expansion or contraction of the said boiler or pipe, said composition being, at the same time, a great non-conductor of heat.

The essential part of our invention consists in the employment of lime putty, or lime mixed with water, so as to be of the consistence of glazier's putty, with some non-conducting fibrous material, such as paper-pulp, and with pulverized earthy materials which are light, porous, and are non-conductors of heat, such as plaster-of-paris, water-lime cement, sand, soap-stone, or black lead.

To enable others skilled in the art to which it relates to make and use our invention, we will proceed to describe the method of preparing the same.

We usually compose our cement of twelve (12) parts of pulp used in the manufacture of paper, five (5) parts of ground plaster-of-paris, two (2) parts of lime putty, one (1) part of white sand, one (1) part of black lead, and (1) one part of soap-stone; or, in lieu of plaster, the same proportion of water-lime cement.

Without confining ourselves to any particular kind of paper-pulp, we prefer to use it when prepared in the following manner: Five hundred pounds of rye-straw are put into a tub of lime-water, in whole bundles, and steamed eight hours longer than for making paper. They are then taken out, thoroughly washed, broken, and drained perfectly dry. Three hundred and fifty pounds of manila rope are put into a tub of lime-water, and steamed same length of time, washed, broken, and drained in the same manner as the straw. The straw and manila are then put into a finishing-engine, to which are added seventy-five pounds of red clay, thirty pounds of alum, ten pounds of soda-ash, eight pounds of rosin, eight pounds of asphaltum, fifteen pounds of sulphur, and drawn to a fiber, instead of being cut, as used for paper-making.

The method of making our composition is to mix the pulp, (prepared as above or otherwise,) the lime putty, white sand, black lead, and soap-stone together with water to about the consistency of ordinary mortar for plastering. Work well together; then add the plaster or cement, mix well, and it is ready to apply.

It will be seen that all the ingredients named are excellent non-conductors of heat, but the special use of the lime putty is to cause the composition to adhere to the surface of the iron to which it is applied, while the paper-pulp binds the composition together, forming a compact and tenacious substance, which will expand and contract with the surface of the pipe or boiler without cracking.

The earthy ingredients are simply useful as non-conductors, and other similar substances may be employed in their place without altering the character of the composition.

What we claim as new, and desire to secure by Letters Patent, is—

1. A composition or cement composed of lime putty, combined, as described, with the ingredients herein named, or their equivalents, when used for the purposes specified.

2. A composition or cement composed of paper-pulp made in the manner set forth, combined, as described, with the ingredients herein named, or their equivalents, when used for the purposes specified.

3. A composition or cement composed of lime putty, combined, as described, with paper pulp or other suitable fibrous non-conducting materials, and with the other ingredients herein named, or their equivalents, when used for the purposes specified.

4. The employment of lime putty, when combined with paper pulp or any other suitable fibrous non-conducting substance, as a material for preventing radiation from heated surfaces, or as an ingredient in any composition used for such purposes.

In testimony whereof we have hereunto set our hands this 6th day of September, 1870.

JOHN RILEY.
CHARLES W. BISSELL.

Witnesses:
CHAS. D. KELLUM,
THOS. F. RILEY.